US009906759B2

(12) United States Patent
Weiblen

(10) Patent No.: US 9,906,759 B2
(45) Date of Patent: Feb. 27, 2018

(54) COMBINED PROCESSING AND DISPLAY DEVICE PACKAGE FOR LIGHT FIELD DISPLAYS

(71) Applicant: QUALCOMM Incorporated, San Diego, CA (US)

(72) Inventor: Michael Eugene Weiblen, Black Hawk, CO (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/682,484

(22) Filed: Apr. 9, 2015

(65) Prior Publication Data

US 2016/0301919 A1    Oct. 13, 2016

(51) Int. Cl.
| | | |
|---|---|---|
| G03B 21/14 | (2006.01) | |
| H04N 9/31 | (2006.01) | |
| G02B 3/00 | (2006.01) | |
| G02B 27/22 | (2018.01) | |

(Continued)

(52) U.S. Cl.
CPC ............ *H04N 9/31* (2013.01); *G02B 3/0068* (2013.01); *G02B 27/2214* (2013.01); *H04N 13/0282* (2013.01); *H04N 13/0447* (2013.01); *H04N 13/0459* (2013.01); *H04N 13/0497* (2013.01); *G03B 21/145* (2013.01); *H04N 9/3147* (2013.01); *H04N 2213/001* (2013.01)

(58) Field of Classification Search
CPC .... G03B 21/14; G03B 21/145; H04N 9/3141; H04N 9/3147; H04N 9/3179
See application file for complete search history.

(56) References Cited

U.S. PATENT DOCUMENTS 6,839,061 B1 *  1/2005  Kamakura ............ G06F 3/1423
                                                          345/1.1
8,736,675 B1    5/2014  Holzbach et al.
(Continued)

FOREIGN PATENT DOCUMENTS

| | | |
|---|---|---|
| CN | 103777454 A | 5/2014 |
| KR | 20140085779 A | 7/2014 |
| WO | 2014147515 A1 | 9/2014 |

OTHER PUBLICATIONS

International Search Report and Written Opinion from International Application No. PCT/US2016/016434, dated May 12, 2016, 11 pp.

(Continued)

*Primary Examiner* — Ryan Howard
(74) *Attorney, Agent, or Firm* — Shumaker & Sieffert, P.A.

(57) ABSTRACT

The disclosure describes packaging structures for light field displays and/or light field projectors. An example device package includes a rendering engine configured to receive scene data and generate light field data for a light field, at least one light field projection unit configured to receive the light field data from the rendering engine and output at least a portion of the light field, and at least one internal communication channel operatively coupling the at least one light field projection unit to the rendering engine. The device package may further include a housing containing the rendering engine, the at least one light field projection unit, and the at least one internal communication channel in a single package.

25 Claims, 7 Drawing Sheets

(51) Int. Cl.
*H04N 13/04* (2006.01)
*H04N 13/02* (2006.01)

(56) References Cited

U.S. PATENT DOCUMENTS

| | | | |
|---|---|---|---|
| 2007/0273837 A1* | 11/2007 | Furui | G03B 37/00 353/31 |
| 2011/0292080 A1* | 12/2011 | Oka | H04N 9/3179 345/634 |
| 2013/0250251 A1* | 9/2013 | Kubota | G03B 21/14 353/57 |
| 2013/0285885 A1 | 10/2013 | Nowatzyk et al. | |
| 2013/0335379 A1 | 12/2013 | Sharma et al. | |
| 2014/0160543 A1 | 6/2014 | Putilin et al. | |
| 2014/0300869 A1 | 10/2014 | Hirsch et al. | |
| 2015/0077311 A1* | 3/2015 | Nishimura | G06F 3/1446 345/1.3 |

OTHER PUBLICATIONS

Hirsch M., et al., "A Compressive Light Field Projection System," ACM Transactions on Graphics, Jul. 2014, vol. 33(4), Article 58, pp. 58:1 to 58:12.

Second Written Opinion issued by the European International Preliminary Examining Authority in International Application No. PCT/US2016/016434 dated Feb. 21, 2017, 7 pp.

International Preliminary Report on Patentability from International Application No. PCT/US2016/016434, dated Jun. 1, 2017, 8 pp.

\* cited by examiner

COMBINED PROCESSING AND DISPLAY DEVICE PACKAGE FOR LIGHT FIELD DISPLAYS

BACKGROUND

A light field three-dimensional display device may output a full plenoptic light field for display. For example, a light field display may be made up of a plurality of light field projectors, each operable to output light at specified angles from specified locations. A viewer's perception of a scene shown by a light field display device may be similar to if the viewer were looking at the real, physical objects that are included in the scene. The viewer may change his or her vantage point to see different views of the image, just as if the viewer were moving with respect to a sculpture or other physical objects in the real world.

SUMMARY

In the examples discussed below, this disclosure describes packaging structures for light field displays and/or light field projectors. In one example, this disclosure describes a package that includes a rendering engine and one or more light field projection units that may enable and/or improve light field display devices. By including a rendering engine and light field projection units in a single device package, such a package may enable more efficient processing of scene data, modularized design, and per-device package calibration control.

In one example a device package includes a rendering engine configured to receive scene data and generate light field data for a light field, at least one light field projection unit configured to receive the light field data from the rendering engine and output at least a portion of the light field, and at least one internal communication channel operatively coupling the at least one light field projection unit to the rendering engine. The device package may further include a housing containing the rendering engine, the at least one light field projection unit, and the at least one internal communication channel in a single package.

In another example a display device includes a plurality of device packages, each of the plurality of device packages being configured to receive scene data, generate, based on the scene data, light field data for a light field, and output at least a portion of the light field. Furthermore, each of the plurality of device packages includes a respective rendering engine and a respective at least one light field projection unit housed in a single package.

In another example a device package includes means for receiving scene data, means for generating, based on the received scene data, light field data for a light field, and means for outputting at least a portion of the light field. The device package may further include means for operatively coupling the means for generating the light field data to the means for outputting at least the portion of the light field, and means for housing, in a single package, the means for receiving the scene data, the means for generating the light field data, the means for outputting at least the portion of the light field, and the means for operatively coupling the means for generating the light field data to the means for outputting at least the portion of the light field data.

In another example a system includes a computing device configured to generate scene data for a three dimensional (3D) scene, the computing device including at least one of a central processing unit (CPU), or a graphics processing unit (GPU), and a display device that includes a plurality of device packages. Each of the plurality of device packages includes a respective rendering engine configured to receive the scene data from the computing device and generate light field data for a light field, a respective at least one light field projection unit configured to receive the light field data from the respective rendering engine and output at least a portion of the light field, and a respective at least one internal communication channel operatively coupling the respective at least one light field projection unit to the respective rendering engine. Each of the plurality of device packages may further include a respective housing containing, in a single package, the respective rendering engine, the respective at least one light field projection unit, and the respective at least one internal communication channel.

The details of one or more examples are set forth in the accompanying drawings and the description below. Other features, objects, and advantages will be apparent from the description and drawings, and from the claims.

DETAILED DESCRIPTION

Figure 1:
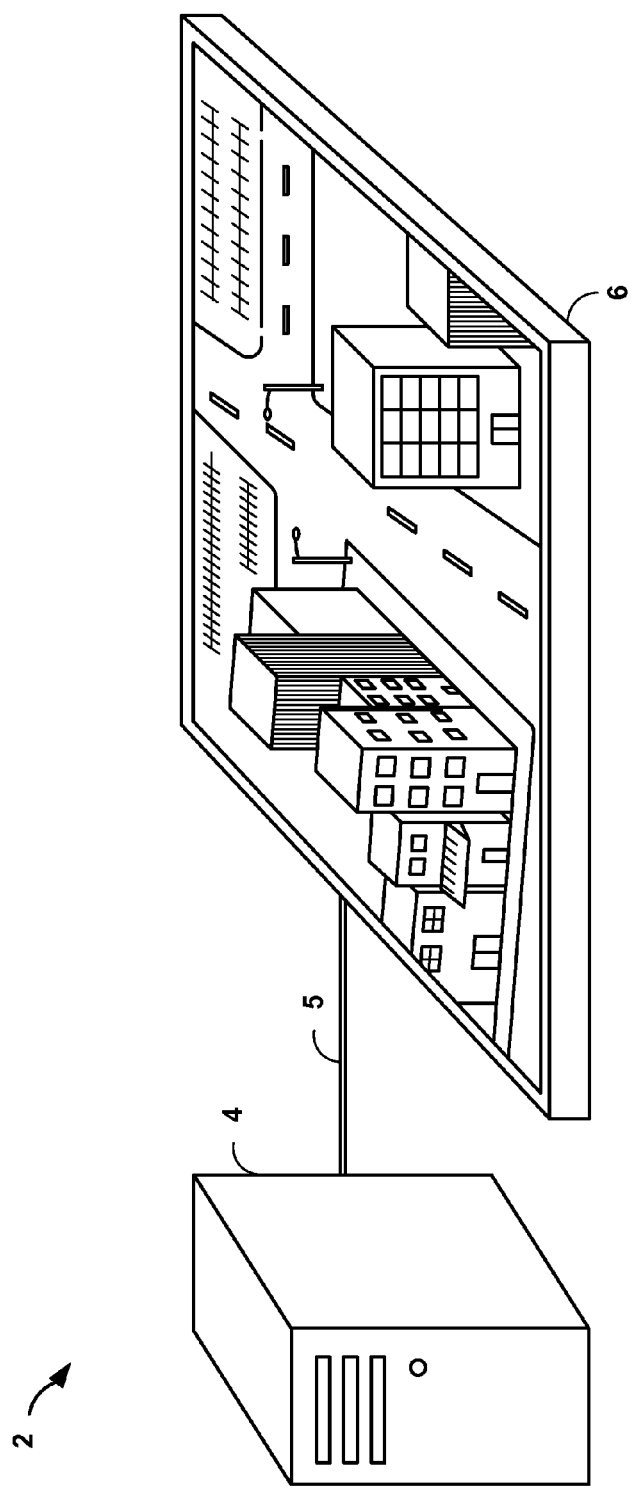
FIG. 1 illustrates an example system configured to display a light field in accordance with one or more examples of the disclosure.

This disclosure describes various example devices, structures, and techniques for enabling and/or improving display of light field content. The examples of this disclosure may represent at least a portion of or be included in devices and/or systems configured to generate light fields for display. While described herein with respect to light field displays, some or all of the examples and techniques of the disclosure may not be so limited. That is, the example devices and techniques described herein may, in some instances, be applicable to various technologies and display devices, including two-dimensional (2D) display devices.

A light field display may provide true three dimensional ("3D") content, such as produced by a hologram. The content may be truly 3D in that the viewer may view the content just the same as if the viewer were viewing real, physical objects. A light field is defined as the position and direction of every ray of light in a space. That is, a light field, as used herein, may be a description of light in a 3D space (e.g., description of a scene). For instance, a light field may be defined by the flow of light through a plane and into the 3D space. In such instance, the light field may be represented by the position and the direction of light rays as they pass through the plane. That is, a light field, in some examples, may be represented as a set of four-dimensional data, with two of the dimensions describing a location of the plane (e.g., two spatial dimensions) at which a light ray passes through the plane, and with the other two dimensions describing the direction in which the light ray leaves the plane (e.g., two directional dimensions). A light field may, in various examples, be referred to as a "plenoptic function," as a plenoptic function is a mathematical representation of a light field.

A display configured to output a light field may be partitioned into "hogels" (e.g., holographic elements), which can be thought of as "directional pixels." A light field projection unit for each hogel may control both the position of emitted light and the directionally-dependent intensity emitted from that position. An array of projection units can therefore be used by a light field display device to output a light field. In different contexts, the term hogel may have different connotations. In the discussion of a conceptual light field, for instance, a hogel may represent a quantized location of the light field and information about the light (e.g., intensity, direction, etc.) at that location in the light field. In the discussion of a light field display device, a hogel may represent an individual light field projection or reflection device usable to output a specific type of light (e.g., color, brightness, etc.) at a specific angle.

In contrast to pixels of a conventional 2D display, the light perceived from light field projection units of a light field display may vary based on the angle at which the device is viewed. By generating a full plenoptic light field, a light field display device may provide full-parallax perspectives, correct for multiple viewers, without the need for glasses, goggles, or moving parts. Each viewer of the light field display device may perceive the correct view for his or her position relative to the display, similar to viewing a sculpture.

Generating a high-resolution, high-framerate light field may entail the need for a very large amount of computational resources (e.g., tens or even hundreds of terabytes of data per second). As a brief example of the potential bandwidth and computational requirements for light field display, generation and/or transmission of 4D light field data can be compared to generation and/or transmission of a typical 2D image. Using, as a baseline, today's "Full HD" resolution of 1920×1080 24-bit RGB pixels at 60 frames per second (fps), the bandwidth is about 375 MB/s. A light field necessitates two additional dimensions for directional resolution, resulting in four dimensions of data. The addition of even a minimal 100×100 directional resolution to a Full HD display increases the bandwidth by 4 orders of magnitude to about 3.75 TB/s. Directional resolution may determine the depth of field or "throw" of the depth image (e.g., how much the image appears to protrude beyond the display surface). More directional resolution may, in some examples, provide a larger range of depth, thus allowing more realistic content. Increasing the directional resolution to 1000×1000 would increase the bandwidth requirement to around 375 TB/s. While optimization techniques or other ways of reducing the load may be possible, the sheer amount of data involved in generating and transmitting a 4D light field will remain substantial.

In view of the computational and bandwidth requirements of light field displays, examples of the present disclosure include a device package that includes a computation unit (e.g., a rendering engine) and one or more light field projection units in a single housing. The device package may be configured to receive scene data that describes a 3D scene, generate light field data for use by the one or more light field projection units, and output at least a portion of a plenoptic light field that represents the 3D scene. In accordance with the examples of this disclosure, a light field display device (e.g., a true 3D display device) can be created by arranging a plurality of device packages into an array to form a substantially planar surface. Each device package may process scene data to generate light field data and output a portion of the light field, together creating the whole light field.

In some examples, the substantially planar surface formed by an array of device packages may be a flat surface. In some examples, the substantially planar surface may be a curved surface. That is, the planar surface may be flat, curved, or some other type of plane. For instance, the substantially planar surface may be arced horizontally or vertically, such that the surface represents a portion of a cylinder. As another example, the substantially planar surface may be arced both horizontally and vertically, such that the surface represents a portion of a sphere, or other shape. The planar surface formed by the device packages may be substantially planar in that the surface may be perceived by the human eye as a generally uniform surface. That is, the surface of each device package need not be perfectly aligned with the surface of every other device package in angle or in setting depth. Instead, some device packages of the substantially planar surface may be at slightly different angles or set slightly deeper or shallower than other device packages. Thus, substantially planar, as described herein, means planar, but not necessarily perfectly so. Each device package may be disposed in accordance with the plane with a small margin of error, such as 5%, 10%, 25%, etc.

By physically embedding the computation unit into the same package as the light field projection units, the two may be more tightly coupled. In this way, the example devices of this disclosure may enable the computation unit of a particular package to be more optimally tailored to the light field projection units of the package, such as providing a more optimal number of resources needed for the number of discrete views the projection units are capable of generating and/or the field of view of the projection units. Furthermore, the device package described herein may enable the implementation of a calibration computation system that may be calibrated to accommodate and/or compensate for any imperfections or inaccuracies in the optics of the package at production time, such as accounting for a slightly misaligned light field projection unit of the package. Packaging as described herein may permit very high-density, high-speed interconnects between the computation unit and optical modulators that generate the light field(s) and may also improve robustness and modularity of the package as a field replaceable system.

In addition, by combining the light field projection units and computation unit in one package, the examples of the present disclosure may allow the computation system to more efficiently generate data by avoiding repeated generation of the same data for different light field projection units. That is, for a given light field to be displayed, a particular light field projection unit may display much of the same content as adjacent light field projection units. A computation unit packaged with the light field projection units may leverage the fact that projection units are physically adjacent, to avoid generating the same data multiple times.

FIG. 1 illustrates an example system 2 configured to display a light field in accordance with one or more examples of the disclosure. System 2 includes computing device 4, connection 5, and light field display device 6. In the example of FIG. 1, computing device 4 may represent any computing device capable of generating scene data that describes a 3D scene. For instance, computing device 4 may represent a personal computer, a desktop computer, a laptop computer, a tablet computer, a computer workstation, a video game platform or console, a mobile telephone (e.g., a cellular or satellite telephone), a wearable device (e.g., a wrist-mounted or head mounted computing device, etc.), a landline telephone, an Internet telephone, a handheld device such as a portable video game device or a personal digital assistant (PDA), a personal music player, a video player, a display device, a digital picture frame, a television, a television set-top box, a server, an intermediate network device, a mainframe computer, any mobile device, or any other type of device that is configured to generate scene data for display.

Scene data or scene information, as used herein, is any information that describes a 3D scene. For instance, scene data may be data defining a collection of polygons or vertices that, taken together, represent the scene. The scene data could represent terrain, buildings, vehicles, atmospheric effects, human beings and/or animals. The scene content may be represented as polygons of connected vertices, or other computer graphics primitives such as non-uniform rational basis spline (NURBS) or spline patches. Geometric data representing such scene content could be 1) elevation data and imagery from USGS captured by aircraft or satellite, 2) motion captured performances of athletes or actors, 3) photographic images to use as realistic textures applied to polygonal surfaces, 4) physics simulations to generate hair, clouds or fluid dynamics, among many others. In other words, scene data describes information about objects and/or properties of the 3D space to be displayed. In some examples, scene data may describe a static scene. By generating scene data for multiple static scenes in which objects and/or properties are changed and/or moved, scene data can be used to describe a dynamic scene, such as video.

In the example of FIG. 1, computing device 4 may include hardware, firmware, software, or any combination thereof. For instance, computing device 4 may include one or more central processing units (CPUs), one or more graphics processing units (GPUs), memory, and one or more storage devices. The storage devices may include one or more programs, such as an operating system, a graphic design program (e.g., a drafting program or photo or video editing program), an image viewer, a video game, a media application (e.g., a movie player), or any other application. Computing device 4 may be configured to load one or more of the software applications into memory and execute the applications using the one or more CPUs.

Computing device 4 may, in the example of FIG. 1, output the scene data via connection 5 to light field display device 6. Connection 5 may be any conventional connection capable of conveying the scene data. For instance, connection 5 may, in various examples, be a universal serial bus connection, a digital video interface connection, a high-definition multimedia interface connection, or any other connection for transferring data. As such, physical properties of connection 5 may limit the overall bandwidth capabilities of connection 5. For instance, the length of connection 5 and/or the material that connection 5 uses to transfer data may limit the bandwidth of connection 5. Higher bandwidth connections could be achieved through specialized technology, such as multiple fiber optic cables, but at substantially increased cost and/or difficulty.

As part of executing various software applications, computing device 4 may generate 3D scene data for a scene to be displayed. As one example, the GPUs may receive application calls (e.g., via an application programming interface or API) from a CPU executing a video game application to generate a 3D scene of a city intersection for the video game. In some examples, such as when computing device 4 does not include a GPU, the CPU itself may generate the 3D scene. Generating the 3D scene may create scene data. That is, an application executing at computing device 4 may cause computing device 4 to create data that describes or defines the characteristics of a 3D space. Rather than rendering that 3D scene into a 2D image (e.g., using modeling, transformation, etc.), computing device 4 may output the scene data describing the city intersection for display.

In the example of FIG. 1, light field display device 6 may receive the scene data from computing device 4. Light field display device 6 may represent a light field display device, capable of using scene data to generate light field data for displaying a full plenoptic light field. As shown in the example of FIG. 1, for instance, light field display device 6 may use the scene data describing the city intersection to generate light field data (e.g., data describing not only the location at which light is output, but also the angle at which it is output) describing the intersection. When viewing the city intersection displayed at light field display device 6, a user may experience a very large number of different views as the user changes his or her vantage point. That is, just as if the city intersection were recreated using actual materials (e.g., cardboard or clay), the user can change his or her vantage point to see different parts of the scene. No glasses are needed, no particular vantage points or viewing areas required.

Light field display device 6, in various examples, may take on any number of form factors. In the example of FIG. 1, for instance, light field display device 6 may represent a tabletop display that lays flat on a tabletop, such that viewers can move around light field display device 6, and view the displayed light field from different angles. In other examples, light field display device 6 may have a desktop monitor or television form factor, a mobile display device form factor (e.g., a display screen for a mobile phone or a PDA), a wearable display device (e.g., a display screen for a watch or goggles), or any other form factor.

Light field display device 6, in the example of FIG. 1, may be made up of one or more device packages as further described herein. Each device package of light field display device 6 may include a rendering engine, at least one light field projection unit, at least one internal communication channel operatively coupling the at least one light field projection unit to the rendering engine, and a housing that contains the rendering engine, the at least one light field projection unit, and the at least one internal communication channel in a single package.

In the example of FIG. 1, the rendering engine of each device package may receive at least a portion of the scene data describing the city intersection from computing device 4. The rendering engine may be configured to generate light field data for a light field based on the received scene data. The light field projection unit or units of each device package may receive the light field data from their respective rendering engines, and output at least a portion of the light field. For instance, each light field projection unit (e.g., each hogel of light field display device 6) may output light specified by the light field data, at an angle also specified by the light field data. The aggregate light outputted by the hogels may be a light field that, to the human eye, shows the city intersection described by the received scene data.

Figure 2:
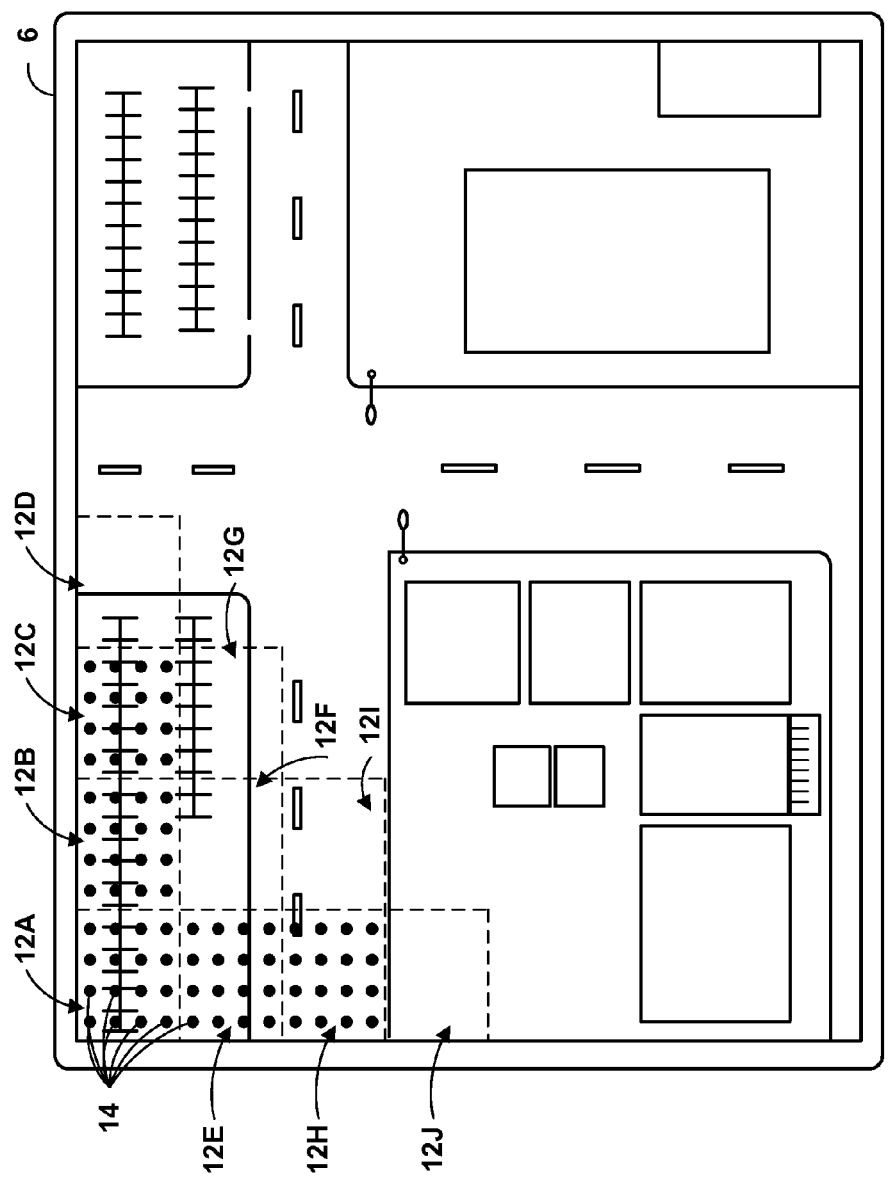
FIG. 2 illustrates one example of a display device configured to display a light field in accordance with one or more examples of the disclosure.

FIG. 2 illustrates one example of a light field display device 6 configured to display a light field in accordance with one or more examples of the disclosure. FIG. 2 shows a top-down view of light field display device 6. Light field display device 6 may be operable to receive scene data and output a full plenoptic light field for display. In the example of FIG. 2, light field display device 6 is outputting the same light field of the city intersection as displayed by light field display device 6 in FIG. 1. In the example of FIG. 2, however, the light field is perceived as showing the tops of the buildings, as if from a bird's eye view. That is, because the viewpoint of the display has changed, the view itself has also changed. In the example of FIG. 2, light field display device 6 is being viewed from above, instead of from a more lateral vantage point, so the perception of the light field being outputted by light field display device 6 is different.

In the example of FIG. 2, light field display device 6 includes device packages 12A-12J (collectively, "device packages 12"). For clarity, only some of device packages 12 are shown. That is, though not shown in the example of FIG. 2, the entire display surface of light field display device 6 may, in some examples, be composed of device packages 12.

Device packages 12, in the example of FIG. 2, include a rendering engine (not shown). Details regarding the rendering engines will be described in more detail below with reference to FIGS. 3 and 5. The rendering engine of one of device packages 12 may be configured to receive scene data and generate light field data for a light field. For instance, the rendering engine may receive at least a portion of scene data describing the city intersection. The rendering engine may generate light field data that can be used to show the city intersection.

In the example of FIG. 2, device packages 12 include one or more light field projection units 14. For clarity, only some of light field projection units 14 are shown. That is, though not shown in the example of FIG. 2, each of device packages 12 may include one or more light field projection units 14. In some examples, device packages 12 may include only a single light field projection unit. In some examples, device packages 12 may include multiple light field projection units (e.g., 4, 5, 10, 100, or another number).

Light field projection units 14 may each be configured to receive the light field data from the rendering engine and output at least a portion of the light field. For instance, the rendering engine of a particular one of device packages 12 may be operatively coupled to the light field projection units 14 of the particular device package via at least one internal communication channel. The light field projection units 14 (each at a specific location) may output light in a specific direction. The light from multiple light field projection units may be perceived by a user as the 3D scene.

Device packages 12, as shown in the example of FIG. 2, may each include a housing that contains, in a single package, the respective rendering engine, the respective ones of light field projection units 14, and any internal communication channels. In the example of FIG. 2, for instance, the housing may take a rectangular or box-like shape. In some examples, the housing may take various other shapes, such as a hexagonal housing, a circular housing, or any other housing capable of containing a rendering engine, one or more light field projection units, and one or more communications channels, in accordance with the examples described herein.

By combining a rendering engine and one or more light field projection units in a single package, the examples described herein may enable light field displays that can handle the very large bandwidth and computational requirements that driving such light field displays may entail. Furthermore, such a unified, modular design may allow for more accurate calibration of light field projection units and/or for easier field replacement of damaged components (e.g., damaged device packages).

Figure 3:
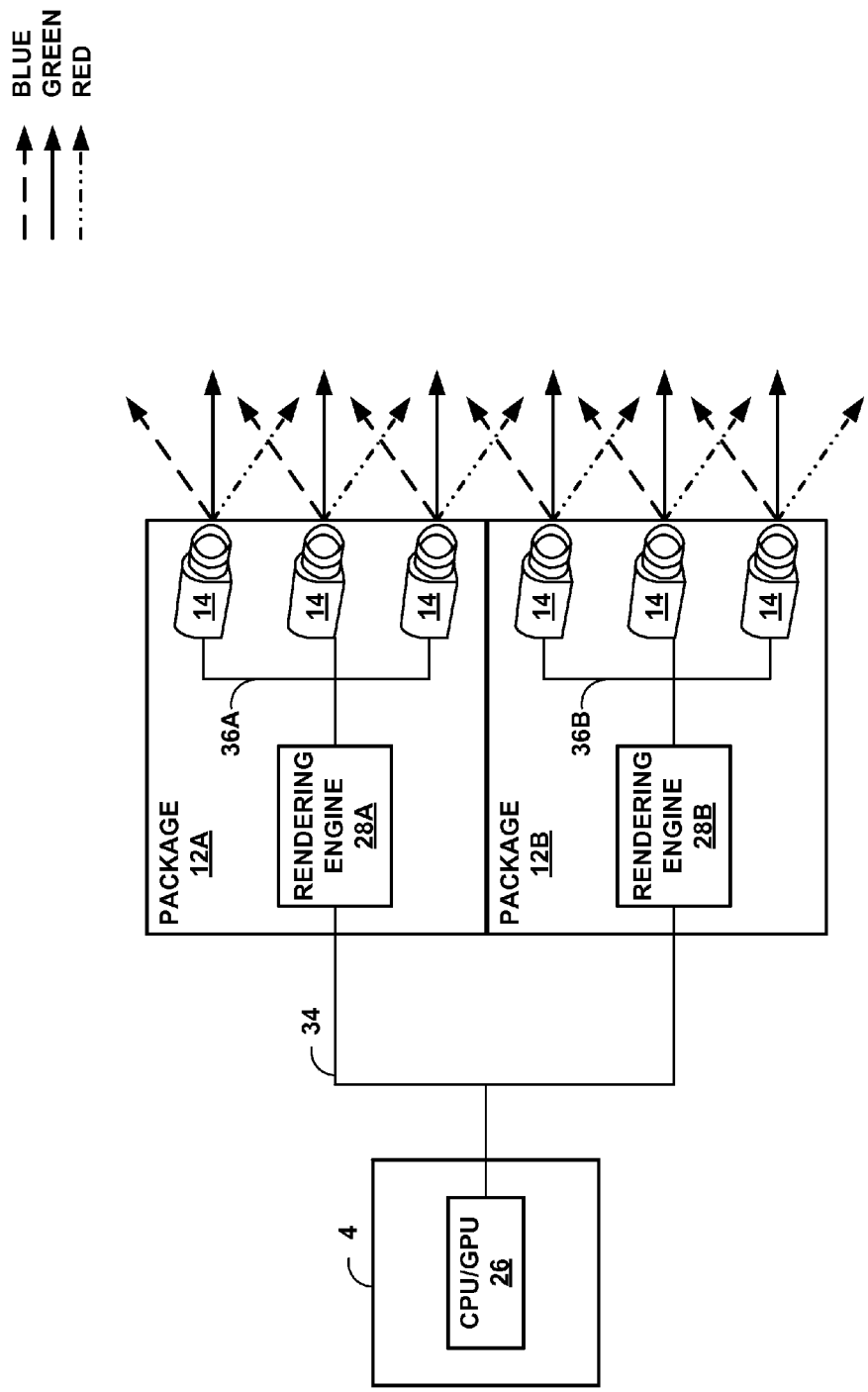
FIG. 3 is a block diagram illustrating an example system configured to display a light field in accordance with one or more examples of the disclosure.

FIG. 3 is a block diagram illustrating an example system configured to display a light field in accordance with one or more examples of the disclosure. The example of FIG. 3 includes computing device 4, and packages 12A and 12B (collectively, "packages 12") of light field display device 6. Computing device 4 includes CPU/GPU 26. Package 12A includes rendering engine 28A and respective light field projection units 14. Package 12B includes rendering engine 28B and respective light field projection units 14. Computing device 4 is connected to packages 12A and 12B via connection 34. Rendering engine 28A is connected to the respective light field projection units 14 of package 12A via connection 36A and rendering engine 28B is connected to the respective light field projection units 14 of package 12B via connection 36B.

CPU/GPU 26 of computing device 4 may execute program instructions. As a result, CPU/GPU 26 may generate scene data for various 3D scenes. The scene data may be for a video game application, a graphics or drafting application, a video player application, or any other application that utilizes static or moving images. As one example of scene data, CPU/GPU 26 may generate scene files (e.g., an XML file, a Wavefront OBJ file, a VRML file, a COLLADA file, an STL file, an X3D file, an OpenFlight file, or other format) that contain objects in a strictly defined language (e.g., XML, plaintext, or other language) or data structure. As another example, CPU/GPU 26 may generate scene data as one or more application programming interface (API) calls using OpenGL, OpenGL ES, Direct3D, Renderman, or others. A scene file or scene data may include geometry, viewpoint, texture, lighting, and shading information and serve as a description of the respective virtual scene. Compared to the amount of light field data required to drive the display of a full plenoptic light field, scene data may be relatively small. For instance, scene data for each scene to be displayed by a light field display device may be on the order of tens or hundreds of megabytes (MB) of data.

Instead of rendering the scenes into 2D images, computing device 4 may output (e.g., via connection 34) the scene data to packages 12A and 12B for further processing and display. In some examples, computing device 4 may transmit all scene data for a particular scene to each connected device package of a light field display device. For instance, computing device 4 may transmit all scene data for the scene to package 12A and to package 12B. In some examples, computing device 4 may transmit different scene data to different device packages. For instance, computing device 4 may transmit a first portion of the scene data to package 12A and a second portion to package 12B. In some examples, a light field display device comprising multiple device packages may include additional logic for receiving scene data and portioning the scene data out to the device packages as needed.

Connection 34, in the example of FIG. 3, may be any suitable connection capable of conveying the scene data. In some examples, because scene data is relatively low bandwidth (e.g., compared to light field data), conventional means of connecting a computing device and display device may be sufficient. For instance, connection 34 may, in some examples, be Ethernet, a universal serial bus connection, a digital video interface connection, a high-definition multimedia interface connection, or any other data connection.

In the example of FIG. 3, packages 12A and 12B may receive the scene data. Rendering engines 28A and 28B may interpret the scene data to generate light field data for the respective light field projection units 14. That is, in the example of FIG. 3, rendering engine 28A may generate light field data for light field projection units 14 of package 12A while rendering engine 28B may generate light field data for light field projection units 14 of package 12B.

Light field data, in some examples, may specify various attributes of the light that is to be emitted from each light field projection unit. For instance, light field data generated by rendering engine 28A may specify an amount of blue light to be output by a first light field projection unit 14 of package 12A and an angle at which the blue light should be output. The light field data may also specify an amount of red light to be output by the light field projection unit and an angle at which the red light should be output. The light field data may also specify an amount of green light to be output by the light field projection unit and an angle at which the green light should be output. The light field data generated by rendering engine 28A may also specify such values for the other ones of light field projection units 14 of package 12A. As such, the rendering engine described herein may generate a very large amount of data for use by light field projection units.

However, the light field data generated for a single light field projection unit may, in some examples, be highly redundant with the light field data generated for an adjacent light field projection unit. That is, because each light field projection unit is close to one another, the output of one hogel may be very similar to adjacent or nearby hogels. By exploiting this redundancy, rendering engine 28A and rendering engine 28B may gain a certain modicum of efficiency when calculating light field information by being preconfigured with information about the locations of each light field projection unit in device package 12A and 12B, respectively. That is, because the rendering engine of a device package is tasked with calculating only the light field data for a specific portion or area of the display, much of the calculated data may be reusable.

In the example of FIG. 3, rendering engine 28A may output the generated light field data to the respective light field projection units 14 via connection 36A and rendering engine 28B may output the generated light field data to the respective light field projection units 14 via connection 36B. Connections 36A and 36B may operatively couple the rendering engine of a device package to the one or more light field projection units of the device package.

Connections 36A and 36B may be specialized connections that are capable of handling very high bandwidth communication. As one example, rendering engine 28A and the respective light field projection units 14 may be part of, or attached to a single substrate, and connection 36A may be one or more etched connections. That is, in some examples, device package 12A may be fabricated as a unified chip and/or device package 12B may be fabricated as a unified chip. As an additional example of connections, connections 36A and 36B may be traces on a printed circuit board, actual wiring, or other transmission means. In some examples, connections 36A and 36B may be highly parallelized to accommodate the bandwidth requirements. That is, while shown in the example of FIG. 3 as a single connection between rendering engine 28A (or 28B) and each of the respective light field projection units 14, connection 36A (or 36B) may actually include multiple communication channels.

Light field projection units 14, in the example of FIG. 3, may receive light field data from rendering engine 28A and 28B, respectively. The light field data received by a light field projection unit may serve as instructions for the light field projection unit, telling it what light to emit, and how to emit it. Each of light field projection units 14 may output at least a portion of the light field, in accordance with the received light field data. In the aggregate, the light field created by the output of the various light field projection units may appear to the human eye as actual, physically present objects making up a scene within and/or without the surface of the light field display device.

FIGS. 4A-4D are block diagrams illustrating various device packages in accordance with one or more examples of the disclosure. Each of FIGS. 4A-4D describes one example configuration of device packages used to create at least a portion of a light field display device. That is, the examples of FIGS. 4A-4D depict various shapes of device packages and how they are arranged to create a display surface. FIGS. 4A-4D are each shown from the perspective of a user directly in front of the display surface.

Figure 4A:
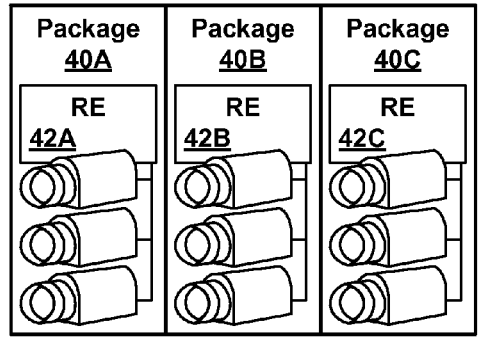
FIGS. 4A-4D are block diagrams illustrating various device packages in accordance with one or more examples of the disclosure.

In the example of FIG. 4A, a light field display device may include device packages 40A-40C. Device packages 40A-40C include rendering engine ("RE") 42A-42C, respectively. As shown in the example of FIG. 4A, each of device packages 40A-40C may include light field projection units arranged in a substantially vertical fashion. That is, each device package may represent a single vertical line of the display surface (or a portion thereof). Rendering engines 42A-42C may generate light field data for use by the corresponding column of projection units. By stacking device packages next to one another, a full display surface may be created for the light field display device.

Figure 4B:
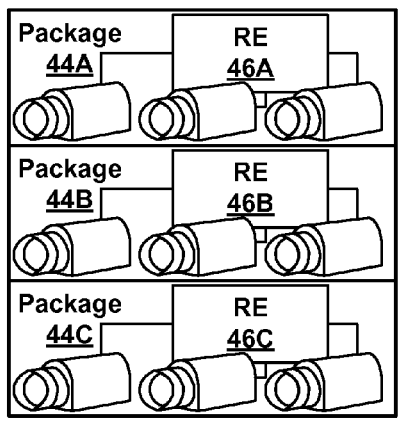

In the example of FIG. 4B, a light field display device may include device packages 44A-44C. Device packages 44A-44C include rendering engine ("RE") 46A-46C, respectively. As shown in the example of FIG. 4B, each of device packages 44A-44C may include light field projection units arranged in a substantially horizontal fashion. That is, each device package may represent a single horizontal line of the display surface (or a portion thereof). Rendering engines 46A-46C may generate light field data for use by the corresponding row of projection units. By stacking device packages on top of one another, a full display surface may be created for the light field display device.

Figure 4C:
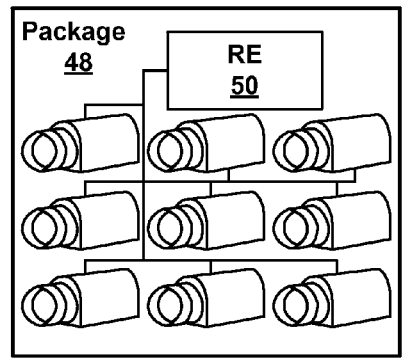

In the example of FIG. 4C, a light field display device may include device package 48. Device package 48 includes rendering engine ("RE") 50. As shown in the example of FIG. 4C, device package 48 may include light field projection units arranged in a 2D matrix. That is, each device package may represent a small rectangular region of the display surface. Rendering engine 50 may generate light field data for use by the corresponding matrix of projection units. By tiling such device packages, a full display surface may be created for the light field display device.

Figure 4D:
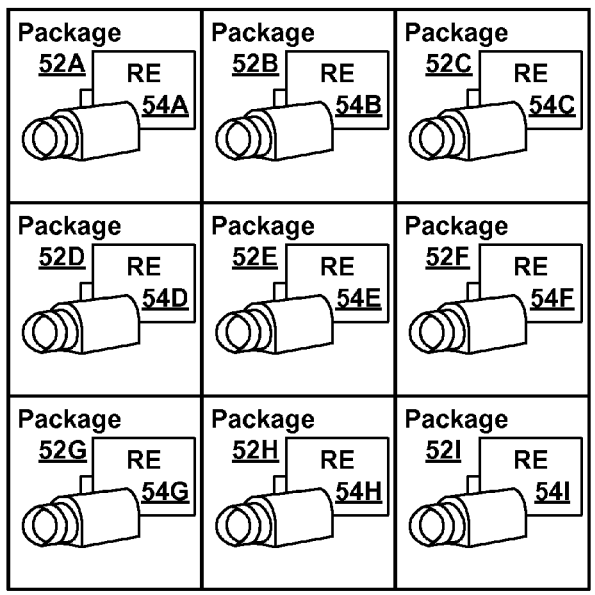

In the example of FIG. 4D, a light field display device may include device packages 52A-52I. Device packages 52A-52I include rendering engine ("RE") 54A-54I, respectively. As shown in the example of FIG. 4D, each of device packages 52A-52I may include a single light field projection unit. That is, each of device packages 52A-52I includes a rendering engine that may generate light field data for a single corresponding projection unit. A light field display device made up of device packages 52A-52I may thus be more parallelized than other configurations. By tiling such device packages, a full display surface may be created.

FIGS. 4A-4D represent only a portion of possible configurations and organizations of device packages. Various other configurations and/or organizations of device packages may be used in accordance with the examples described herein. That is, any suitable shape and organization may be used to house, in a single package, a rendering engine, at least one light field projection unit, and at least one internal communication channel, as described herein.

Figure 5:
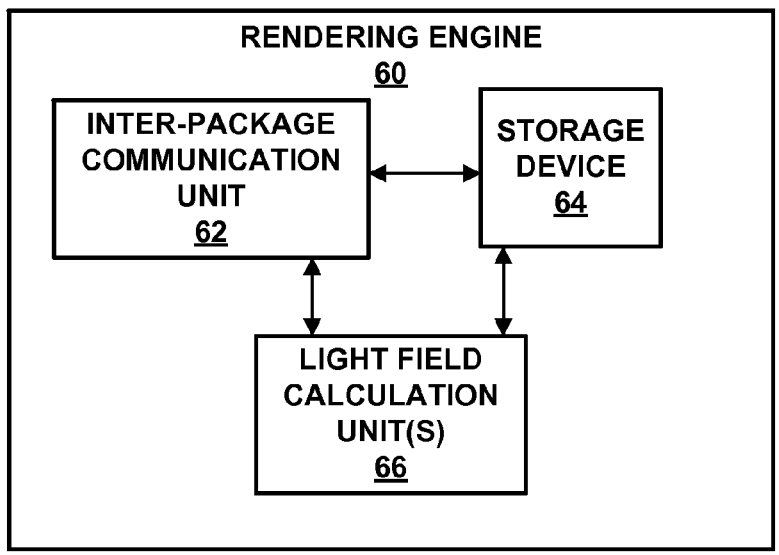
FIG. 5 is a block diagram illustrating one example of a rendering engine in accordance with one or more examples of the disclosure.

FIG. 5 is a block diagram illustrating one example of a rendering engine 60 in accordance with one or more examples of the disclosure. Rendering engine 60 may be an example of rendering engines 28A and/or 28B, as shown in FIG. 3. Rendering engine 60 includes inter-package communication unit 62, storage device 64, and one or more light field calculation unit(s) 66.

Light field calculation units 66, as shown in the example of FIG. 5, may be configured to generate light field data. That is, calculation units 66 may be the core of rendering engine 60, creating the information that can be used by projection units (not shown) to output a light field.

Light field data may be generated using many different algorithms, including rasterization or ray-tracing. Two different rasterization approaches are 1) for a given position in space, generate all the directional rays, or 2) for a given direction, generate all the spatially-distributed rays.

In the first case, for the location of every hogel, a rendering engine may generate a 2D image of the scene from the viewpoint of the hogel. For the light field to create a perceived image both in front and behind the plan of hogels, both a forward-perspective and reverse-perspective projection are used. Each of those perspective images can then be projected directly by the hogel projector (e.g., a light field projection unit), as the perspective projection generates all directions from that one position. If a light field display device consists of 50×50=2500 hogels, each of 10×10=100 directions, then the rendering engine may render the 2500 hogels with a 10×10 viewport. Using perspective projection may employ special handling to avoid a divide-by-zero singularity that occurs at the hogel's actual position in the plane of projection.

For the second case, rendering engines may render the entire scene using an orthographic projection for every direction of the entire display (all rays are parallel in one direction). The individual pixels of that orthographic image must be distributed to all hogels of the light field display device. Given the display configuration above, the rendering engines may render 10×10=100 orthographic images each of 50×50 pixels, then distribute those 2500 pixels to their respective portion of the 2500 hogels. The orthographic projection does not have the singularity issues of the perspective projection. Distributing the image data across hogels may use a memory architecture specifically designed for distribution of orthographically-rendered pixels in order to avoid poor locality of reference within the memory architecture.

In the example of FIG. 5, inter-package communication unit 62 may be configured to facilitate communication with other device packages. As previously described, the light field data generated for a single light field projection unit may be highly redundant with the light field data generated for an adjacent light field projection unit. In some examples, such adjacent projection units may be part of different device packages. For example, two projection units may be at the edge of respective device packages, but nonetheless adjacent to one another. In order to avoid duplicative computation, device packages may be configured to communicate with one another in order to share information.

For example, a first device package including rendering engine 60 may be configured to send, to an adjacent device package and via inter-package communication unit 62, light field data that is generated by light field calculation units 66. The adjacent device package may be able to use the received light field data in generating its own light field data. Additionally or alternatively, light field calculation units 66 may, in some examples, receive light field data from another device package (e.g., via inter-package communication unit 62). Light field calculation units 66 may then use the received light field calculation data in generating light field data. In other words, instead of each device package having to generate light field data "from scratch," device packages may have inter-package communication units that are configured to share information to reduce overall computational cost and delay.

Inter-package communication unit 62, as shown in the example of FIG. 5, may additionally or alternatively be configured to facilitate communication with other types of components, such as display tiles. A display tile may be a similar to a device package in that both include at least one light field projection unit. However, a display tile does not include a rendering engine. That is, a device package, as described herein, may be a "smart" device that can generate light field data from received scene data, and display at least a portion of a light field using the generated light field data. A display tile, as described herein, may be a "dumb" device, configured to display a portion of a light field using light field data, but unable to generate light field data itself. Thus, display tiles may use light field data generated by a device package (e.g., by light field calculation units 66 of rendering engine 60).

In the example of FIG. 5, storage device 64 may be configured to store information for use by light field calculation units 66 during generation of light field data. In some examples, storage device 64 may be a short-term memory for storing information that is transient. In some examples, storage device 64 may additionally or alternatively be a long-term memory for storing more intransient information or even permanent information. One example of information that may be stored at storage device 64 is calibration data. Other data may include the location of the device package within a larger display, so the device package knows which portion of the scene it is responsible to render.

Calibration data may be data that light field calculation units 66 may use in order to account for various differences in the light field projection units of a device package. For instance, calibration data may include information indicating how much the light field data should be compensated to account for an imperfect orientation of a light field projection unit, information indicating how much the light field data should be compensated for a brightness or luminance imperfection of a light field projection unit, information indicating how much the light field data should be compensated for a color or chrominance imperfection of a light field projection unit, or any other information that may be used to modify generated light field data to improve a user's experience of the output light field.

In some examples, calibration data may be created as part of manufacture. That is, after a device package is created, the device package may be tested to determine if there are any defects in the package's ability to generate light fields. If such defects exist, the manufacturer (or other entity) may write data to storage device 64 to calibrate the device package in order to minimize the effect of any defects. In some examples, calibration data may be user modifiable data. For instance, a user may indicate that he or she wants a light field display device to output a brighter light field (e.g., by using a user interface of the light field display device). As a result, storage device 64 may include calibration data that, when used by light field calculation units 66, results in a brighter light field being output by the device package. Other user-modifiable calibration data may include data to account for one or more "dead" or inoperable projection units (e.g., similar to dead pixels of a 2D display), or any other information that a user may provide to cause light field calculation units 66 to modify the way in which light field data is generated.

Figure 6:
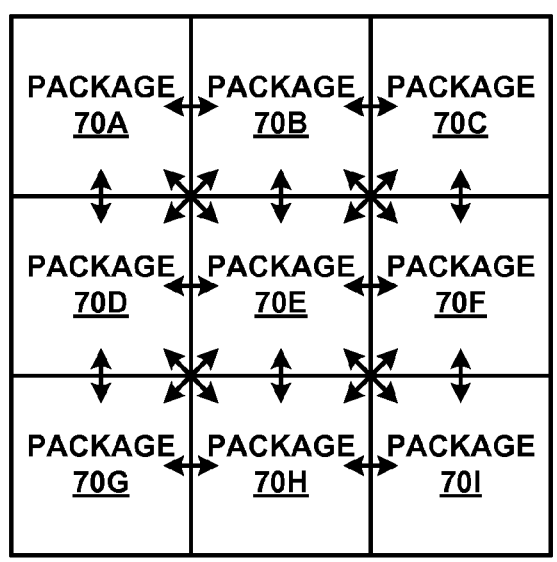
FIG. 6 is a block diagram illustrating inter-package communication in accordance with one or more examples of the disclosure.

FIG. 6 is a block diagram illustrating inter-package communication in accordance with one or more examples of the disclosure. The example of FIG. 6 includes device packages 70A-70I (collectively, "device packages 70"). Device packages 70 may represent a portion of the display surface of a light field display device. For instance, device packages 70 may represent a portion of light field display device 6 as described with respect to FIG. 1.

In the example of FIG. 6, each of device packages 70 may be a device housed in a single package that is configured to receive scene data, generate light field data for a light field, and output at least a portion of the light field. Each of device packages 70 may include a respective inter-package communication unit similar to inter-package communication unit 62 of FIG. 5.

Each of device packages 70, in the example of FIG. 6, may be configured to communicate with adjacent ones of device packages 70 via their respective inter-package communication units. For instance, package 70A may be configured to communicate with package 70B, 70D, and/or 70E, package 70B may be configured to communicate with package 70A, 70C, 70D, 70E, and/or 70F, and so on. Though not shown in FIG. 6, device packages 70 may, in some examples, be further configured to communicate with non-adjacent device packages. For instance, package 70A may be configured to communicate with package 70G (e.g., by sending data through package 70D).

By enabling device packages to communicate among one another, each device package may still benefit from being highly parallelized, but may avoid the drawbacks of redundant processing. That is, for instance, instead of package 70A having to generate light field data for a light field projection unit on its right edge and package 70B having to independently generate light field data for a light field projection unit on its left edge, packages 70A and 70B can communicate so that only one needs to generate its respective information, and the other can simply modify the generated information, thereby reducing computational requirements.

The scene content to be rendered may not be of uniform complexity across the display surface (e.g.: a dense crowd of people concentrated in an otherwise sparse gaming field). As such, device packages may use inter-device communication to perform load-balancing among device packages. For instance, if the scene content is such that some rendering engines have less-expensive work to perform, they may be able to help with more computationally-intensive portions of the scene. The heavily-loaded rendering engines could call upon the lightly-loaded rendering engines to assist in distributing the load more evenly across all available computation resources.

Figure 7A:
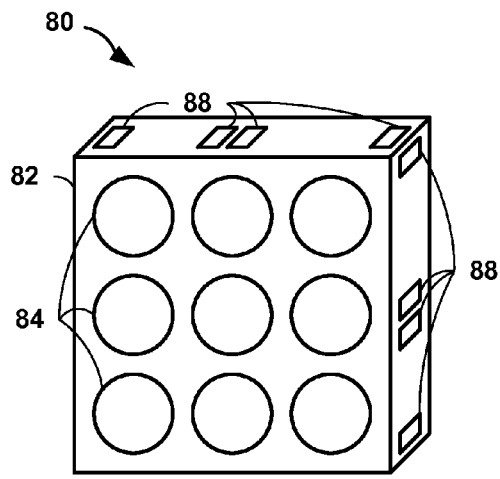
FIGS. 7A and 7B illustrate one example of a device package in accordance with one or more examples of the disclosure.
Figure 7B:
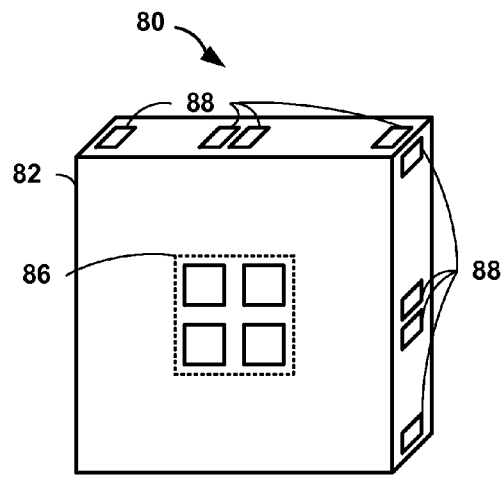

FIGS. 7A and 7B illustrate one example of a device package 80 in accordance with one or more examples of the disclosure. FIG. 7A may represent a front view of device package 80, while FIG. 7B may represent a rear view of device package 80. Device package 80 includes housing 82 and light field projection units 84. Though not shown, device package 80 may also include a rendering engine and at least one internal communication channel operatively coupling the rendering engine to light field projection units 84.

In the example of FIGS. 7A and 7B, housing 82 is a square box-like housing, having a front, a back, and four sides disposed between the front and back. Housing 82 may be made of any suitable material, such as a plastic, a glass, a metal, or other materials. The front of housing 82 includes nine openings for light field projection units 84, arranged in a square grid pattern. As shown in the example of FIG. 7A, light field projection units 84 may be flush with the surface of housing 82. In some examples, light field projection units 84 may be slightly recessed or may slightly protrude from the surface of housing 82.

The rear of housing 82 includes connection points 86. Connection points 86 may be conductive pads, sockets, prongs, or any other structure usable to connect to device package 80. Device package 80 may use connection points 86 to receive data, such as scene data, from other sources. In some examples, device package 80 may additionally or alternatively receive power through one or more of connection points 86.

Given the square shape of housing 82 and the square pattern of light field projection units 84, additional device packages may be tiled on each side of device package 80 to create the display surface of a light field display device. In order to facilitate communication among such tiled device packages, device package 80 includes inter-connection points 88. While shown in the example of FIGS. 7A and 7B as being on the sides of device package 80, inter-connection points 88 may additionally or alternatively be at other locations. For instance, inter-connection points 88 may be on the rear of device package 80 along with connection points 86. In such instance, inter-connection points 88 may connect to a trace of a printed circuit board or other connection to communicate with other device packages. Including inter-connection points on the rear of a device package may ensure that the inter-connection points do not interfere with the alignment of individual device packages for optical accuracy.

Inter-connection points 88 may be conductive pads, sockets, prongs, or any other structure usable to connect to device package 80. That is, device package 80 may use one or more of inter-connection points 88 to communicate with other device packages and/or with device tiles to send and receive light field data. In some examples, device package 80 may additionally or alternatively receive power through one or more of inter-connection points 88. For instance, device package 80 may receive power input through connection points 86, and may make that power available to other device packages via inter-connection points 88. In this way, not every device package needs to be directly connected to power inputs.

Figure 8A:
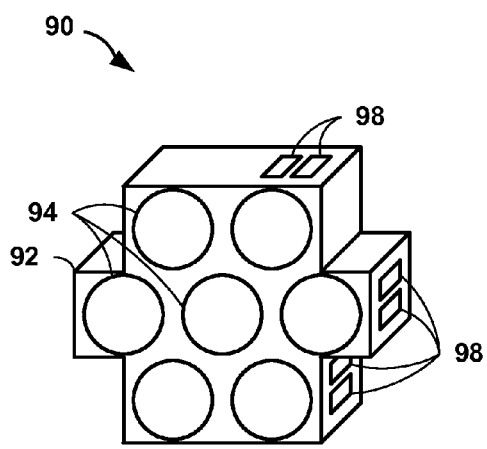
FIGS. 8A and 8B illustrate another example of a device package in accordance with one or more examples of the disclosure.
Figure 8B:
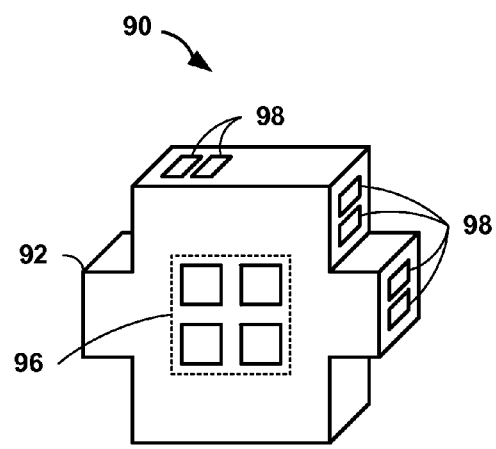

FIGS. 8A and 8B illustrate another example of a device package 90 in accordance with one or more examples of the disclosure. FIG. 8A may represent a front view of device package 90, while FIG. 8B may represent a rear view of device package 90. Device package 90 includes housing 92 and light field projection units 94. Though not shown, device package 90 may also include a rendering engine and at least one internal communication channel operatively coupling the rendering engine to light field projection units 94.

In the example of FIGS. 8A and 8B, housing 92 is a multi-sided housing, having a front, a back, and eight sides disposed between the front and the back. Housing 92 may be made of any suitable material, such as a plastic, a glass, a metal, or other materials. The front of housing 92 includes seven openings for light field projection units 94, arranged in a radial pattern with one opening in the center and six openings spaced equally around the center opening. As shown in the example of FIG. 8A, light field projection units 94 may be flush with the surface of housing 92. In some examples, light field projection units 94 may be slightly recessed or may slightly protrude from the surface of housing 92.

The rear of housing 92 includes connection points 96. Connection points 96 may be conductive pads, sockets, prongs, or any other structure usable to connect to device package 90. Device package 90 may use connection points 96 to receive data, such as scene data, from other sources. In some examples, device package 90 may additionally or alternatively receive power through one or more of connection points 96.

Given the particular shape of housing 92 and the radial pattern of light field projection units 94, additional device packages may be tiled in a radial fashion around the sides of device package 90 to create the display surface of a light field display device. In order to facilitate communication among such tiled device packages, some of the sides of device package 90 include inter-connection points 98. While shown in the example of FIGS. 8A and 8B as being on the sides of device package 90, inter-connection points 98 may additionally or alternatively be at other locations. For instance, inter-connection points 98 may be on the rear of device package 90 along with connection points 96. In such instance, inter-connection points 98 may connect to a trace of a printed circuit board or other connection to communicate with other device packages. Including inter-connection points on the rear of a device package may ensure that the inter-connection points do not interfere with the alignment of individual device packages for optical accuracy.

Inter-connection points 98 may be conductive pads, sockets, prongs, or any other structure usable to connect to device package 90. That is, device package 90 may use one or more of inter-connection points 98 to communicate with other device packages and/or with device tiles to send and receive light field data. In some examples, device package 90 may additionally or alternatively receive power through one or more of inter-connection points 98. For instance, device package 90 may receive power input through connection points 96, and may make that power available to other device packages via inter-connection points 98. In this way, not every device package needs to be directly connected to power inputs.

The examples of FIGS. 7A, 7B and 8A, 8B illustrate only two example device packages, and other device package shapes, sizes, and configurations may be used in various examples within the scope of this disclosure. Differing physical properties of device packages (e.g., shape, size, orientation, etc.) may be leveraged to enhance proper alignment between packages when creating an array (e.g., for a display surface). For instance, device packages may have keyed edges or tongue and groove structures to enable interlocking of device packages. Tongue and groove structures or similar interlocking configurations may ensure and/or enforce more accurate relative positioning of arrayed device packages. That is, in some examples, device packages may be formed such that proper connection of two or more of the device packages necessarily requires accurate placement to create a display surface.

Figure 9:
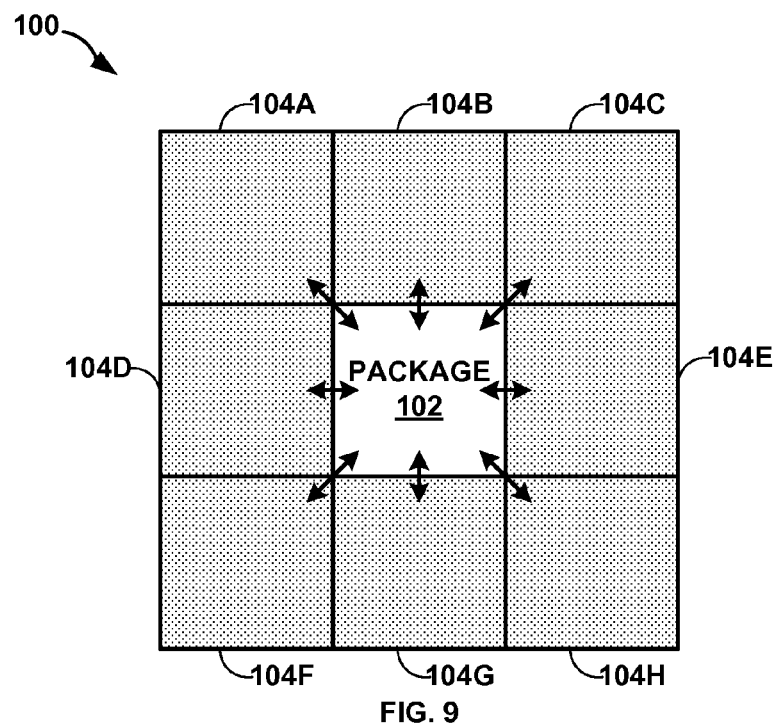
FIG. 9 is a block diagram illustrating an example portion of an arrangement of device packages in accordance with one or more examples of the disclosure.

FIG. 9 is a block diagram illustrating an example portion 100 of an arrangement of device packages in accordance with one or more examples of the disclosure. Portion 100 represents one example of how a device package may be used to drive one or more display tiles. Portion 100 includes device package 102 and display tiles 104A-104H (collectively, "display tiles 104").

In the example of FIG. 9, device package 102 may include a rendering engine configured to receive scene data and generate light field data for a light field and at least one light field projection unit configured to receive the light field data from the rendering engine and output at least a portion of the light field. Device package 102 may also include at least one internal communication channel operatively coupling the at least one light field projection unit to the rendering engine and a housing containing the rendering engine, the at least one light field projection unit, and the at least one internal communication channel in a single package.

Each of display tiles 104 may include one or more light field projection units, but may not include a rendering engine. That is, display tiles 104 may be "dumb" devices that can receive light field data for a light field and use the light field data to output at least a portion of the light field.

In the example of FIG. 9, device package 102 may be operatively connected to each of display tiles 104. Device package 102 may also be configured to generate light field data for use by each of display tiles 104. For example, device package 102 may receive scene data for a scene from a computing device (not shown). Instead of generating light field data only for those light field projection units housed in device package 102, the rendering engine of device package 102 may additionally generate light field data for use by light field projection units housed in each of display tiles 104 as well. The rendering engine of device package 102 may send (e.g., via an inter-package communication unit of device package 102) the generated light field data to each of display tiles 104. Each of display tiles 104 may receive the light field data, and output at least a portion of the light field in accordance with the received light field data.

In this way, not every component of a light field display screen need have its own rendering engine. Instead, a single rendering engine may be configured to provide multiple parts of the display screen with light field data for use in generating the light field. In some examples, the arrangement of portion 100 may be repeated in the horizontal and/or vertical directions to create a display screen.

Figure 10:
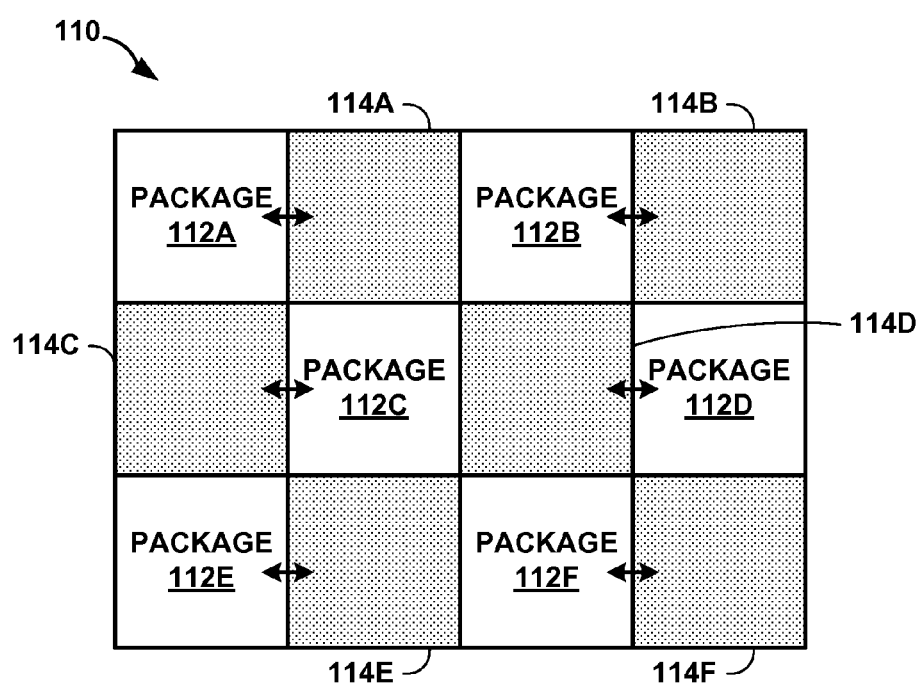
FIG. 10 is a block diagram illustrating another example portion of an arrangement of device packages in accordance with one or more examples of the disclosure.

FIG. 10 is a block diagram illustrating another example portion 110 of an arrangement of device packages in accordance with one or more examples of the disclosure. Portion 110 represents one example of how device packages may be used to drive one or more display tiles. Portion 110 includes device packages 112A-112F (collectively, "device packages 112") and display tiles 114A-114F (collectively, "display tiles 114").

In the example of FIG. 10, each of device packages 112 may include a rendering engine configured to receive scene data and generate light field data for a light field and at least one light field projection unit configured to receive the light field data from the rendering engine and output at least a portion of the light field. Device packages 112 may also include at least one internal communication channel operatively coupling the at least one light field projection unit to the rendering engine and a housing containing the rendering engine, the at least one light field projection unit, and the at least one internal communication channel in a single package.

Each of display tiles 114 may include one or more light field projection units, but may not include a rendering engine. That is, display tiles 114 may be "dumb" devices that can receive light field data for a light field and use the light field data to output at least a portion of the light field.

In the example of FIG. 10, each respective one of device packages 112 may be operatively connected to a respective one of display tiles 114. For instance, device package 112A may be operatively connected to display tile 114A, device package 112B may be operatively connected to display tile 114B, and so on. Device packages 112 may also be configured to generate light field data for use by the respective one of display tiles 114. For example, device package 112A may receive scene data for a scene from a computing device (not shown). Instead of generating light field data only for those light field projection units housed in device package 112A, the rendering engine of device package 112A may additionally generate light field data for use by light field projection units housed in display tile 114A as well. The rendering engine of device package 112A may send (e.g., via an inter-package communication unit of device package 112A) the generated light field data to display tile 114A. Display tile 114A may receive the light field data, and output at least a portion of the light field in accordance with the received light field data.

In this way, not every component of a light field display screen need have its own rendering engine. Instead, a single rendering engine may be configured to provide an additional display tile of the display screen with light field data for use in generating the light field. In some examples, the arrangement of portion 110 may be repeated in the horizontal and/or vertical directions to create a display screen.

While particular combinations of various aspects of the examples are described above, these combinations are provided merely for illustration purposes. Accordingly, the examples and techniques of this disclosure should not be limited to these example combinations and may encompass any conceivable combination of the various aspects of the examples and/or techniques described in this disclosure.

The examples of this disclosure may be implemented as, or as part of a wide variety of devices or apparatuses, including a wireless handset, an integrated circuit (IC) or a set of ICs (e.g., a chip set). Various components, modules, or units are described in this disclosure to emphasize functional aspects of the units, but do not necessarily require realization by different hardware units. Rather, as described above, various units may be combined in a single hardware unit or provided by a collection of interoperative hardware units, including one or more processors as described above, possibly in conjunction with suitable software and/or firmware.

Various examples have been described. These and other examples are within the scope of the following claims.

What is claimed is:

1. A device package comprising:
    a rendering engine configured to receive scene data that describes a three-dimensional (3D) scene and generate light field data for a light field that represents less than all of the 3D scene;
    at least one light field projection unit configured to receive the light field data from the rendering engine and output at least a first portion of the light field;
    at least one internal communication channel operatively coupling the at least one light field projection unit to the rendering engine;
    an inter-package communication unit operably coupled to the rendering engine and configured to send at least a second portion of the light field data generated by the rendering engine to a display tile that includes at least one additional light field projection unit and does not include a second rendering engine; and
    a housing containing the rendering engine, the at least one light field projection unit, the at least one internal communication channel, and the inter-package communication unit in a single package,
    wherein the rendering engine is configured to receive the scene data from at least one processor not contained by the housing.

2. The device package of claim 1, wherein the at least one light field projection unit comprises a plurality of light field projection units, and wherein the rendering engine is configured to generate respective light field data for each of the plurality of light field projection units.

3. The device package of claim 1, wherein the inter-package communication unit is further configured to send, to at least one other device package, the generated light field data.

4. The device package of claim 3, wherein the inter-package communication unit is further configured to receive, from the at least one other device package, additional light field data for the light field, the additional light field data being generated by the at least one other device package.

5. The device package of claim 4, wherein the rendering engine is configured to generate the light field data using the additional light field data.

6. The device package of claim 3, wherein the housing comprises at least one inter-connection pad configured to provide a physical connection between the device package and the at least one other device package.

7. The device package of claim 1, further comprising a data storage unit operatively coupled to the rendering engine, the data storage unit being configured to store calibration data, wherein the rendering engine is configured to generate the light field data using the calibration data, and wherein the housing further contains the data storage unit.

8. The device package of claim 7, wherein the calibration data is user-modifiable.

9. The device package of claim 7, wherein the calibration data comprises at least one of:
    an orientation compensation value for the at least one light field projection unit;
    a luminance compensation value for the at least one light field projection unit;
    a chrominance compensation value for the at least one light field projection unit;
    directional calibration of the rays within a light field projection unit; or
    positional compensation between two or more light field projection units.

10. The device package of claim 1, wherein the rendering engine and the at least one light field projection unit are both part of a single substrate.

11. The device package of claim 1, wherein the at least one light field projection unit is configured to output at least a portion of the light field by outputting light at an angle specified by the light field data.

12. The device package of claim 1, wherein the at least one light field projection unit comprises a single light field projection unit.

13. A display device comprising:
- a plurality of device packages, each of the plurality of device packages being configured to receive scene data, generate, based on the scene data, light field data for a light field, and output at least a portion of the light field, wherein each of the plurality of device packages includes a respective rendering engine and a respective at least one light field projection unit housed in a single package, and
- wherein the plurality of device packages is disposed in a tiled, two-dimensional array to form a substantially planar surface for viewing the light field; and
- at least one display tile configured to receive, from the first device package, at least a portion of the light field data generated by the first device package, and output at least a portion of the light field,
- wherein the at least one display tile includes at least one additional light field projection unit, and
- wherein the at least one display tile does not include a rendering engine.

14. The display device of claim 13, wherein each of the plurality of device packages further includes a respective at least one internal communication channel operatively coupling the respective at least one light field projection unit to the respective rendering engine, and a respective housing containing the respective rendering engine, the respective at least one light field projection unit, and the respective at least one internal communication channel,
- wherein the respective rendering engine is configured to receive the scene data and generate the light field data for the light field, and
- wherein the respective at least one light field projection unit is configured to receive the light field data from the rendering engine and output the at least a portion of the light field.

15. The display device of claim 13, wherein a first device package from the plurality of device packages further includes an inter-package communication unit, wherein the respective housing included in the first device package further contains the inter-package communication unit, and wherein the inter-package communication unit of the first device package is configured to send, to another package, the light field data generated by the first device package.

16. The display device of claim 15, wherein the inter-package communication unit of the first device package is further configured to receive, from a second device package from the plurality of device packages, additional light field data generated by the second device package, and wherein the respective rendering engine of the first device package is configured to generate the light field data using the additional light field data generated by the second device package.

17. The display device of claim 13, wherein the at least one display tile is configured to output the at least a portion of the light field without modifying the received light field data.

18. The display device of claim 13, wherein the at least one display tile comprises a plurality of display tiles, each display tile from the plurality of display tiles configured to receive the at least a portion of the light field data from a respective one of the plurality of device packages.

19. The display device of claim 13, wherein the plurality of device packages are further configured to communicate with one another, and wherein at least two device packages from the plurality of device packages are further configured to balance respective computational loads by generating light field data for a portion of the light field that is output by another of the at least two device packages.

20. A device package comprising:
- means for receiving scene data that describes a three-dimensional (3D) scene;
- means for generating, based on the received scene data, light field data for a light field that represents less than all of the 3D scene;
- means for outputting at least a first portion of the light field;
- means for sending at least a second portion of the light field to a means for displaying the second portion of the light field that does not include the means for generating the light field data;
- means for operatively coupling the means for generating the light field data to the means for outputting at least the first portion of the light field, and for operatively coupling the means for sending at least the second portion of the light field to the means for generating the light field data; and
- means for housing, in a single package, the means for receiving the scene data, the means for generating the light field data, the means for outputting at least the first portion of the light field, the means for sending at least the second portion of the light field, and the means for operatively coupling the means for generating the light field data to the means for outputting at least the portion of the light field data, and for operatively coupling the means for sending at least the second portion of the light field to the means for generating the light field data,
- wherein the means for receiving scene data comprises means for receiving the scene data from at least one processor not contained by the means for housing.

21. The device package of claim 20, further comprising:
- means for sending, to at least one other device package, the light field data; and
- means for receiving, from the at least one other device package, additional light field data for the light field, the additional light field data being generated by the at least one other device package,
- wherein the means for housing further houses the means for sending the light field data and the means for receiving the additional light field data.

22. The device package of claim 21, wherein the means for generating the light field data comprises means for generating the light field data using the additional light field data.

23. The device package of claim 20, further comprising means for storing calibration data, wherein the means for generating the light field data comprises means for generating the light field data using the calibration data, and wherein the means for housing further houses the means for storing the calibration data.

24. The device package of claim 20, wherein the calibration data comprises non-user-modifiable data.

25. A system comprising:
- a computing device configured to generate scene data for a three dimensional (3D) scene, the computing device including at least one of a central processing unit (CPU), or a graphics processing unit (GPU); and
- a display device that includes a plurality of device packages, wherein each of the plurality of device packages includes:

a respective rendering engine configured to receive the scene data from the computing device and generate light field data for a light field;

a respective at least one light field projection unit configured to receive the light field data from the respective rendering engine and output at least a portion of the light field;

a respective at least one internal communication channel operatively coupling the respective at least one light field projection unit to the respective rendering engine;

a respective housing containing, in a single package, the respective rendering engine, the respective at least one light field projection unit, and the respective at least one internal communication channel;

an inter-package communication unit, wherein the respective housing included in the first device package further contains the inter-package communication unit, and wherein the inter-package communication unit of the first device package is configured to send, to another package, at least a portion of the light field data generated by the first device package; and at least one display tile configured to receive, from the first device package, at least a portion of the light field data generated by the first device package, and output at least a portion of the light field, wherein the at least one display tile includes at least one additional light field projection unit, and wherein the at least one display tile does not include a rendering engine; and wherein the plurality of device packages is disposed in a tiled, two-dimensional array to form a planar surface of the display device for viewing the light field.

\* \* \* \* \*